United States Patent

[11] 3,573,381

[72] Inventor Michael J. Marcus
Cambridge, N.J.
[21] Appl. No. 810,618
[22] Filed Mar. 26, 1969
[45] Patented Apr. 6, 1971
[73] Assignee Bell Telephone Laboratories Incorporated
Murray Hill, N.J.

[54] TIME DIVISION SWITCHING SYSTEM
18 Claims, 22 Drawing Figs.

[52] U.S. Cl. .......... 179/15, 340/166, 340/173
[51] Int. Cl. .......... H04j 3/16
[50] Field of Search .......... 179/15 (ATI), 18.7 (YA), 15 (A) (AT); 340/166, 173

[56] References Cited
UNITED STATES PATENTS
3,391,390 7/1968 Crane .......... 340/172.5
FOREIGN PATENTS
822,297 10/1959 Great Britain .......... 179/15ATI

*Primary Examiner*—Ralph D. Blakeslee
*Attorneys*—R. J. Guenther and James Warren Falk

ABSTRACT: This application is directed to a time division communication system in which a switching network, comprising combination crosspoint switching and data storage devices, transposes data among various time channels during its transmission between multichannel, time multiplex highways.

INVENTOR
M. J. MARCUS
BY
R. C. Winter
ATTORNEY

PATENTED APR 6 1971 3,573,381

SHEET 02 OF 12

TIME DIVISION SWITCHING SYSTEM

BACKGROUND OF THE INVENTION

The current practice in telephone systems generally is to establish a solid connection between a calling line and a called line via a path which is associated individually and uninterruptedly with the connection for the duration of the call. Thus a quantity of equipment, dependent upon the number of lines served and the expected frequency of service, is provided in a common pool from which portions may be chosen and assigned to a particular call. Such an arrangement is referred to as "space division" in which the privacy of each conversation is assured by the division or separation of individual conversations in space.

In contrast, telephone systems have been developed which operate on a time division basis in which a number of conversations share a single communication highway. Privacy of conversation is assured in such systems by the division or separation of individual conversations in time. Thus each conversation is assigned to the common highway for an extremely short, periodically recurring interval, and the connection between any two lines in communication is completed only during the assigned interval or time channel. Samples which retain essential characteristics of the voice or other signal are transmitted over the common highway in these time channels and are utilized in the called line to reconstruct the original signal.

A critical problem is presented in both space and time division systems when one or more stages of switching are interposed between the calling and called lines. This problem is termed "blocking" and arises when a portion of the switched path is not available for assignment to a potential connection.

Space division networks minimize the blocking problem primarily through redundancy of available network paths which, of course, is expensive. Time division networks attack the problem by interchanging the time channels assigned to particular call connections in various stages of the network. This is accomplished by incorporating delay in the common highways or intermediate the switching elements. Thus a conversation transmitted in one time channel on a first highway may be shifted to different channels in successive highways to which it is switched en route to its destination.

SUMMARY OF THE INVENTION

The blocking problem is solved in accordance with my invention by employing a novel switching element which incorporates the delay necessary for performance of the time channel interchange function. The switching network has the appearance of a space division network with switching elements at each crosspoint of an incoming highway with an outgoing highway. However, unlike the space division network, each crosspoint switching element through which a particular conversation is transmitted may be enabled and disabled many times during the course of the conversation, while in the space division network the same crosspoint switching elements would remain in the enabled state throughout the conversation.

Of even greater significance, however, is the storage property of the crosspoint switching elements which facilitates the time channel interchange achieved by distinct delay devices in the prior art. Thus in accordance with an illustrative embodiment of my invention, each crosspoint switching element comprises a multisignal storage and readout device such as a shift register. In a matrix of such crosspoint switching and storage elements, termed crosspoint stores hereinafter, a discrete signal in a first time channel of an input highway reaches a desired output highway in the same or another time channel via a particular crosspoint store.

The signal is registered in the crosspoint store by enabling the store input during said first time channel. During the next repetitive cycle of time channels, termed a frame, the crosspoint store output is enabled to dump all of the signals stored during the current frame into the output highway. No effort is made to rearrange the order of registration of signals in the store from the sequence in which they are received. However, as each crosspoint store is emptied, it automatically enables another store serving the same output highway but a different input highway.

A local memory for each switching stage, under control of a common control facility, specifies the time for enablement of each crosspoint store input in order to permit the input signals arriving in specified time channels of a plurality of input highways to be transferred to the proper output highway during the succeeding frame. Of course it is necessary for the local memory and common control to know the time channels in which the signals reach the desired output highway since these time channels form the input channels in the next switching stage. Thus a mapping in time and space as prescribed by the local memory is performed in each switching stage.

According to one aspect of the invention, the local memory is arranged so as to create a time channel for occupancy by message signals being transmitted over a newly established connection. This is accomplished by inserting the new message signals in a time channel between two previously occupied channels in a crosspoint store in each stage of switching along the assigned route. This operation serves to force signals in the subsequent time channels of the frame to occupy different time channels as they emerge on each interstage and final output highway, while the sequence of signals, as received from each input highway en route to a common output highway, is preserved. This insertion or squeezing operation advantageously may be performed by a reentrant shift register which adds a stage to one end of the reentrant loop each time a new time channel is to be inserted.

According to another aspect of the invention, line concentration is performed by a switching stage of crosspoint stores which has a single output highway for transmission of intelligence and a single output highway for transmission of supervisory information. The intelligence and supervisory signals are multiplexed on the input highways to the concentrator stage in predetermined time channels.

According to a further aspect of the invention, the common control determines the route of a new call connection upon receipt of the terminal designations merely by determining which interstage highways have free time channels and which crosspoint stores having access to the selected highways can accommodate the new message. All of this information is readily ascertained upon interrogation of the local memory in each stage.

Advantageously, the network according to this embodiment of my invention can accommodate signals on the same call connection in successive time channels of the same frame so long as sufficient space is available in the crosspoint registers. This permits the multiplexing of different frequency signals simply by allotting proportionately more time channels in each frame to the higher frequency signals.

DRAWING

FIGS. 1A—1C depict various time division switching networks employed in the prior art;

Figure 2:
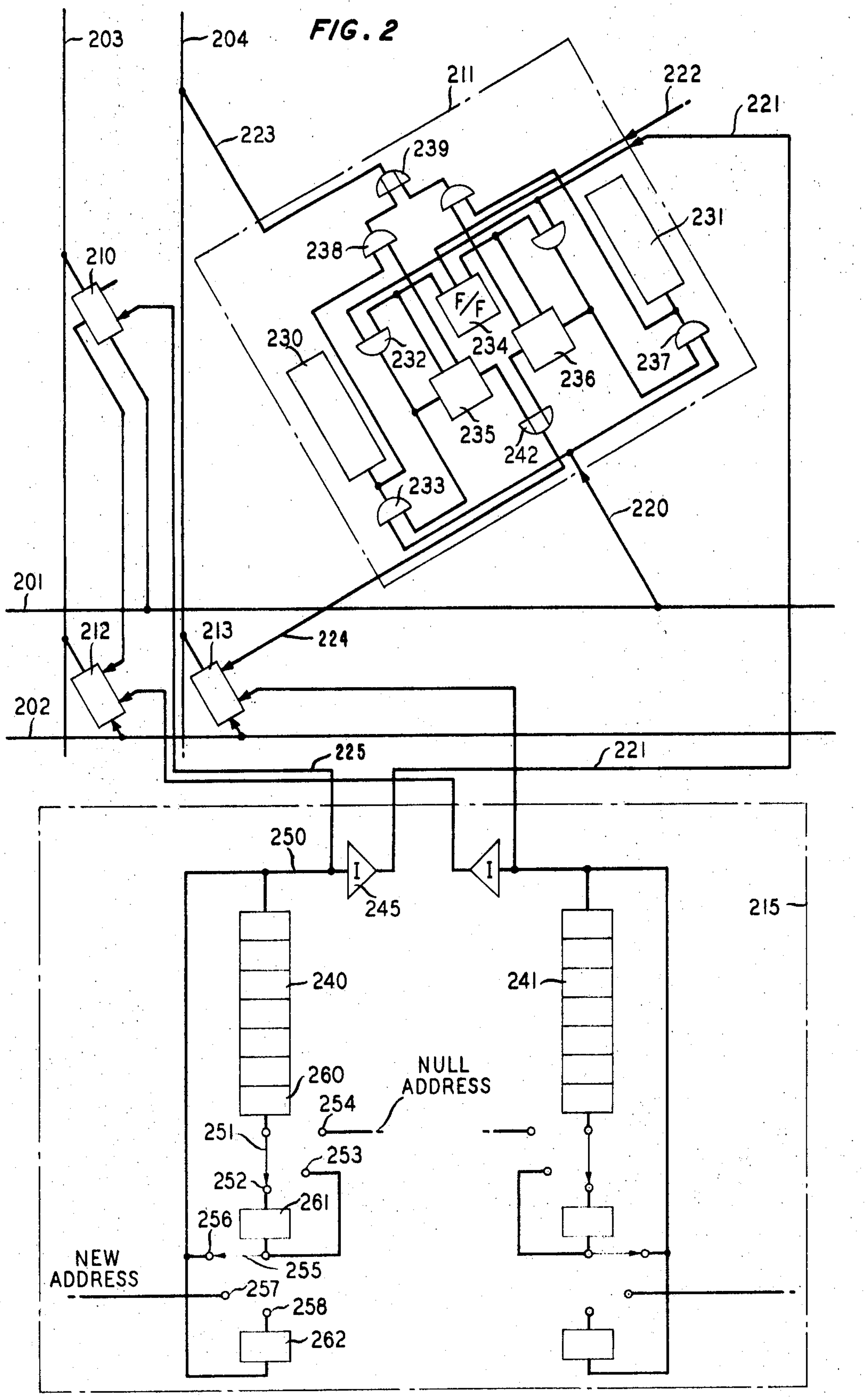
FIG. 2 depicts a switching network and its local control in accordance with one illustrative embodiment of this invention.
Figure 5:
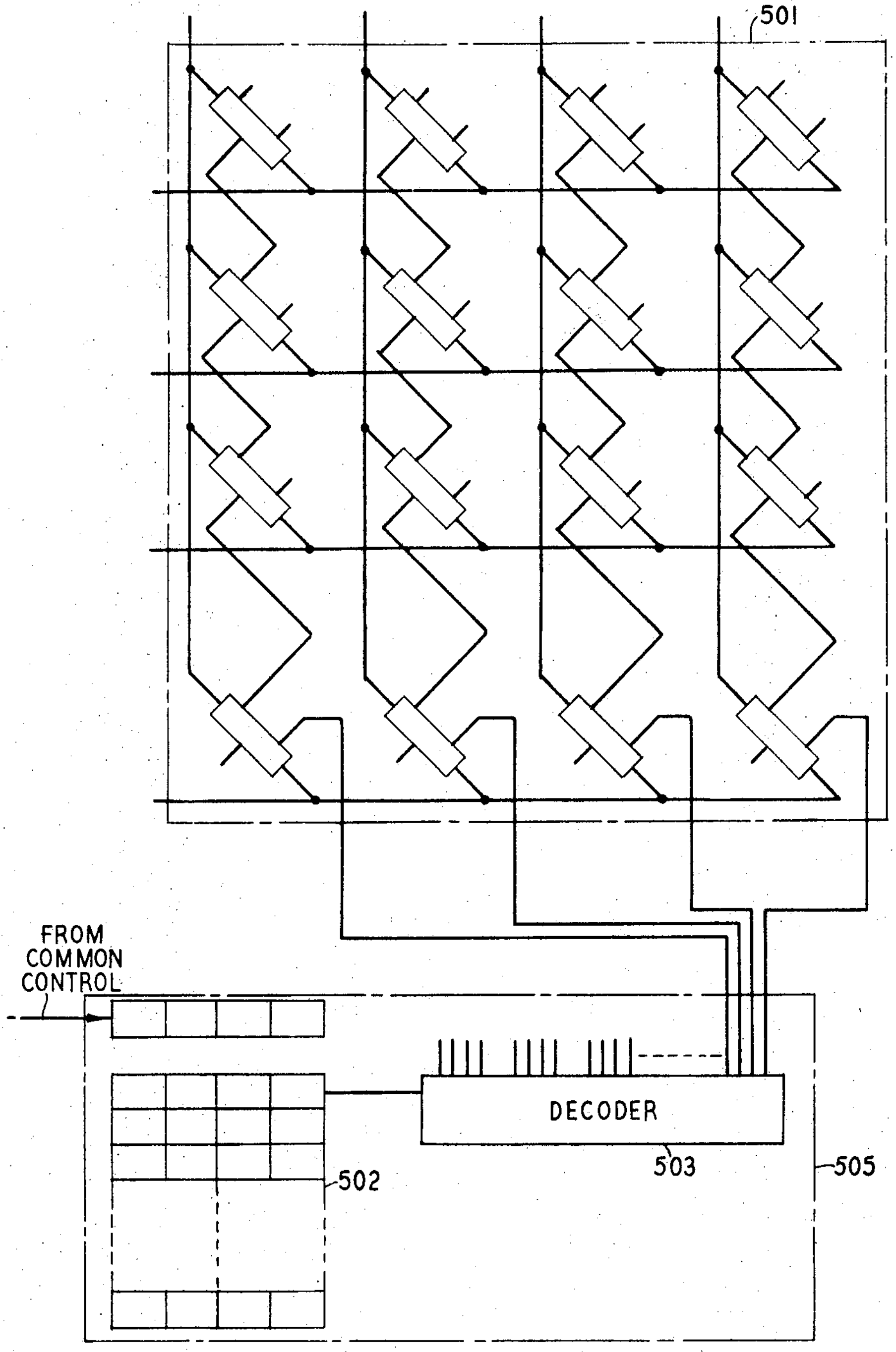
Figure 6:
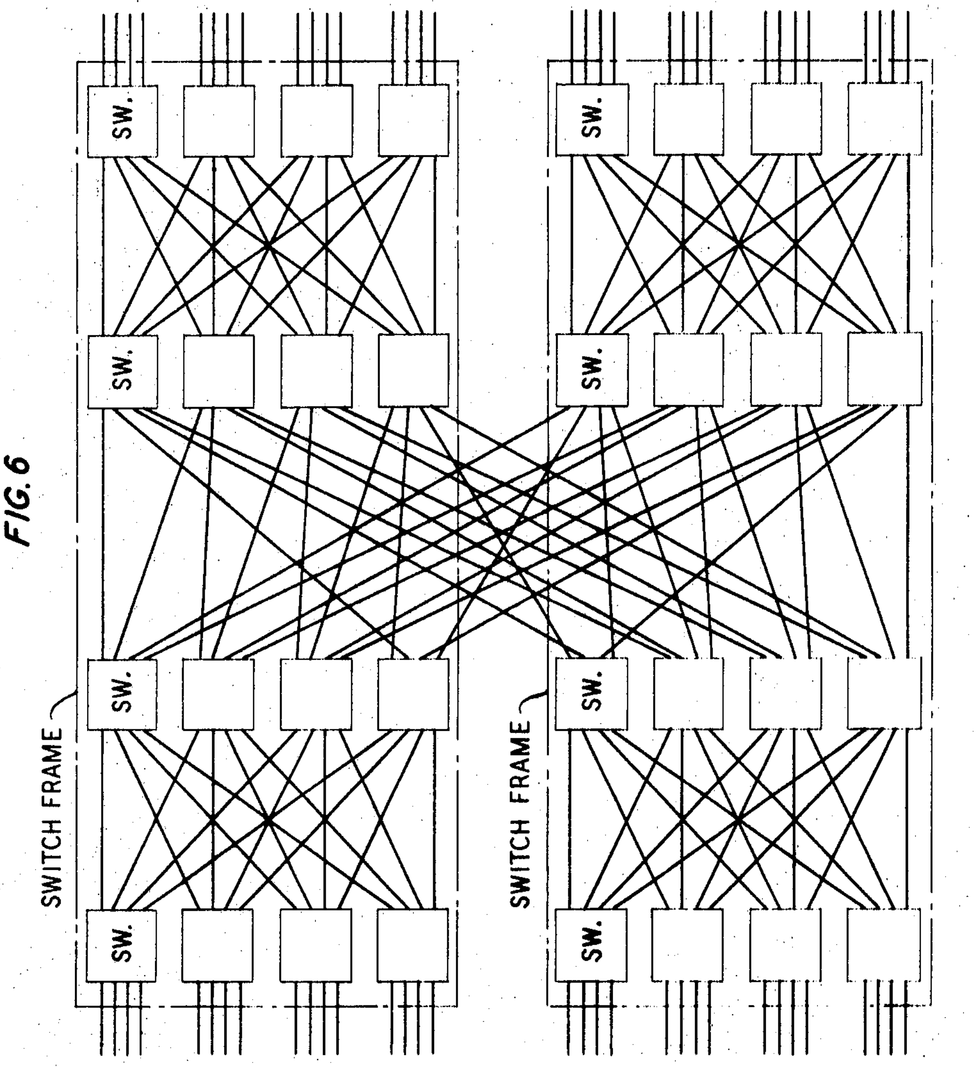
Figure 7:
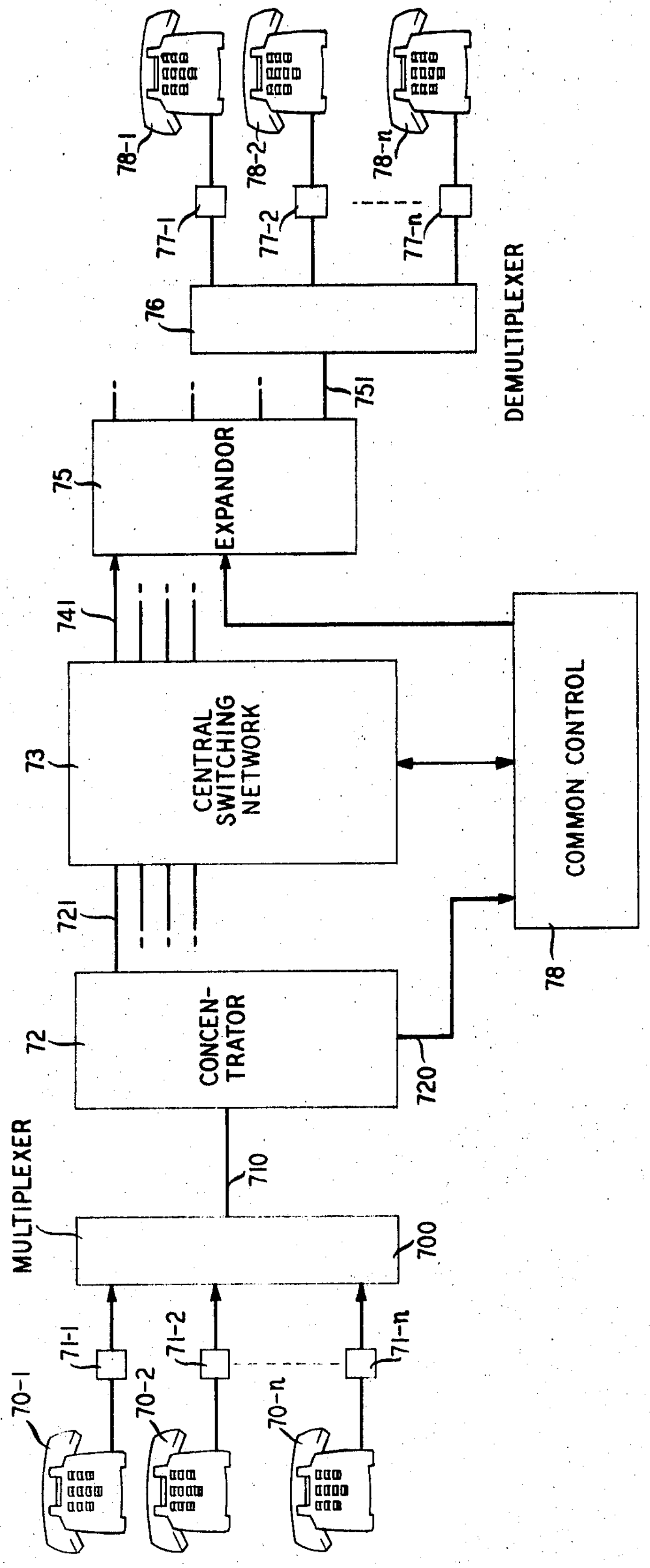
Figure 8:
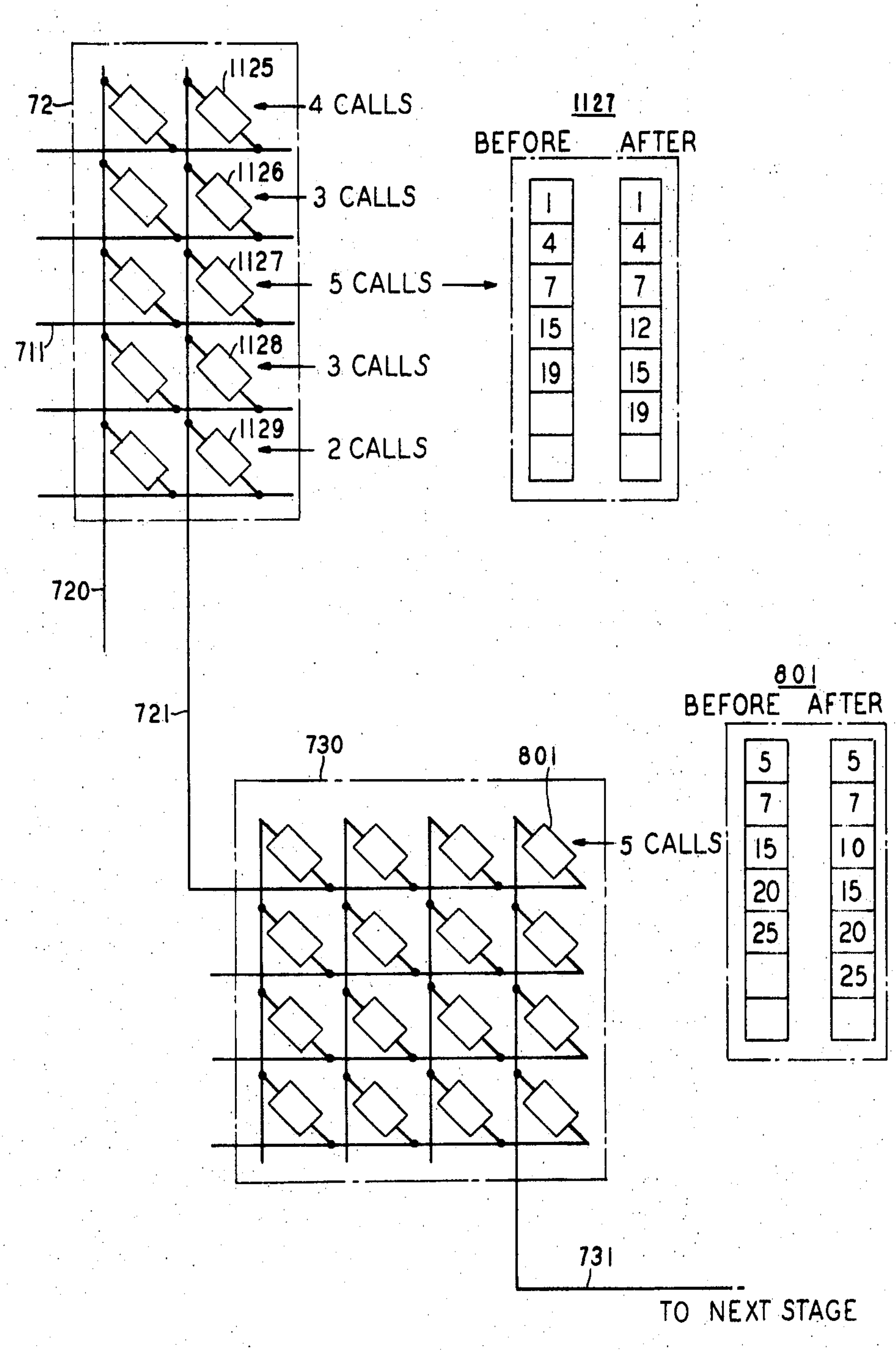
Figure 9:
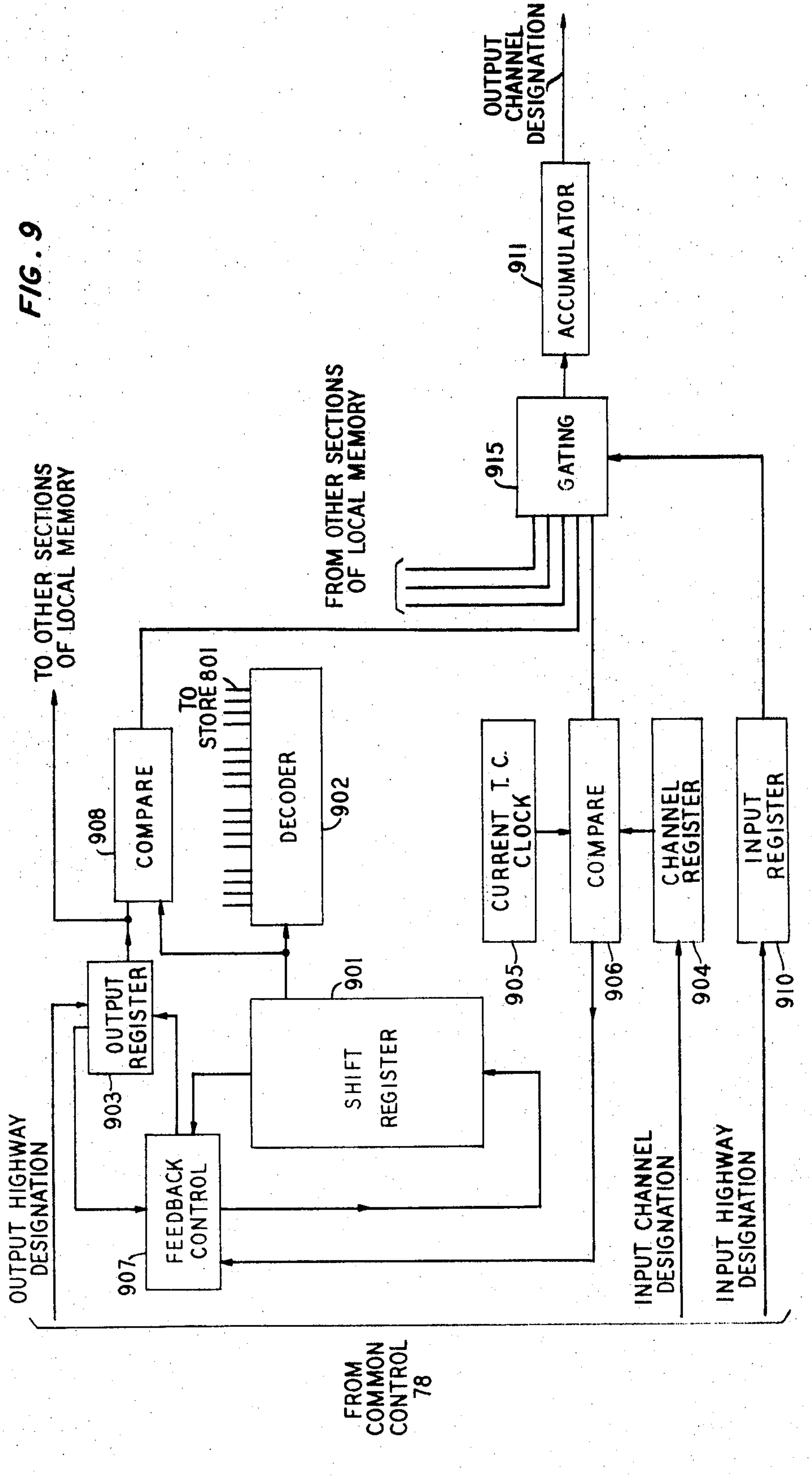
Figure 10:
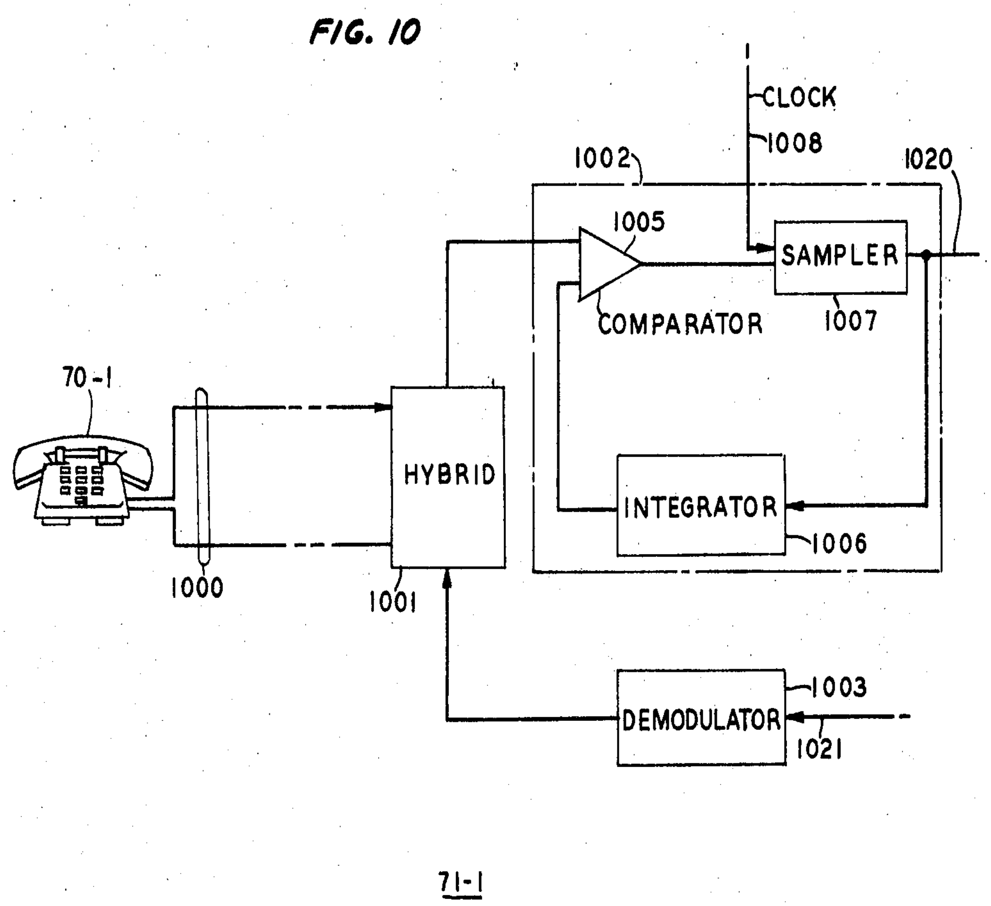
Figure 11:
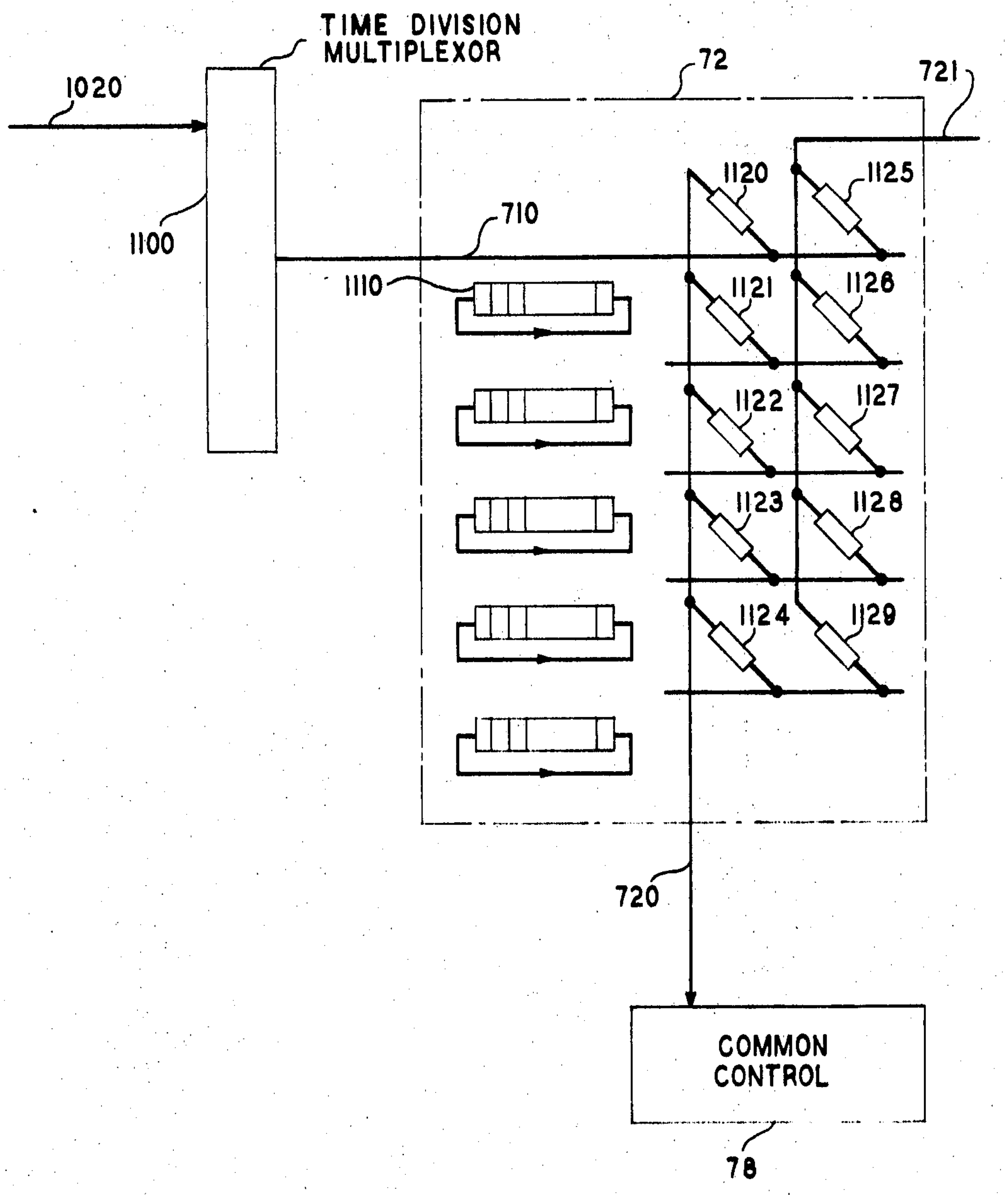
Figure 12:
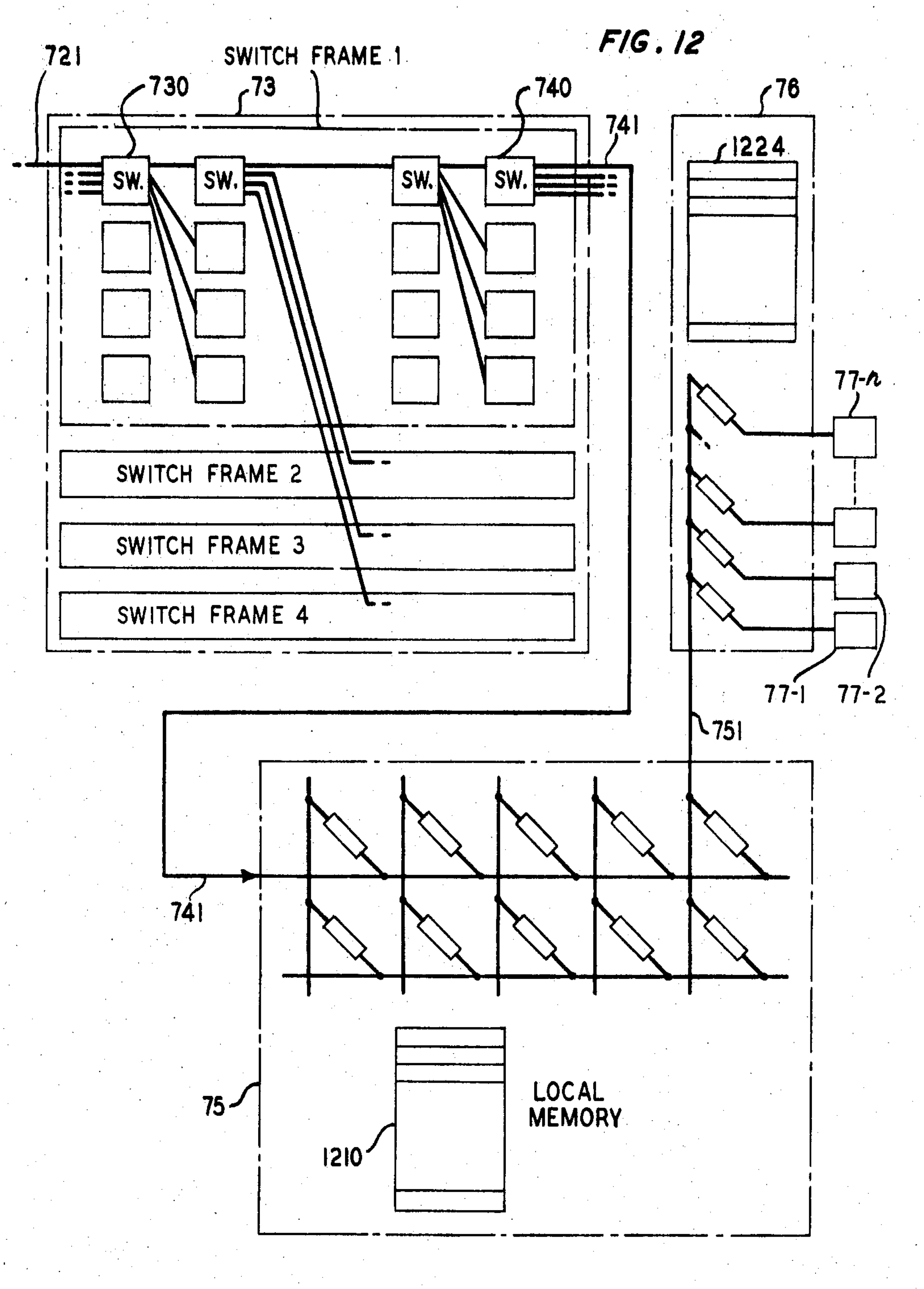
Figure 13:
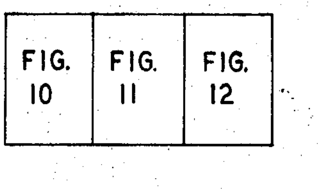

FIGS. 4A—4H illustrate the flow of information through one of the storage devices of the local memory depicted in FIG. 2;

FIG. 5 depicts in block diagram form a larger network of the type depicted in FIG. 2;

FIG. 6 is a block diagram representation of a multistage network utilizing an arrangement of the type depicted in FIGS. 2 and 5 in each stage;

FIG. 7 is a simplified block diagram representation of a complete system utilizing the type of arrangement depicted in FIGS. 2 and 5 in each switching stage;

FIG. 8 is a diagram illustrating the progress of a message through consecutive stages of a network utilizing the type of arrangement depicted in FIGS. 2 and 5 in each stage;

FIG. 9 is a block diagram representation of the control equipment required to facilitate time channel assignments in the network of FIG. 2; and FIGS. 10—12 provide a more detailed block diagram of the system of FIG. 7, the arrangement of FIGS. 10—12 being shown in the key diagram of FIG. 13.

DETAILED DESCRIPTION

Figure 1A:
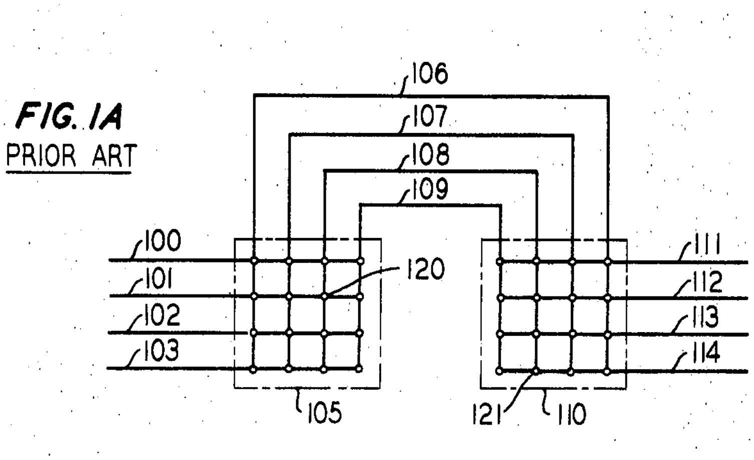
FIG. 1A PRIOR ART
Figure 1B:
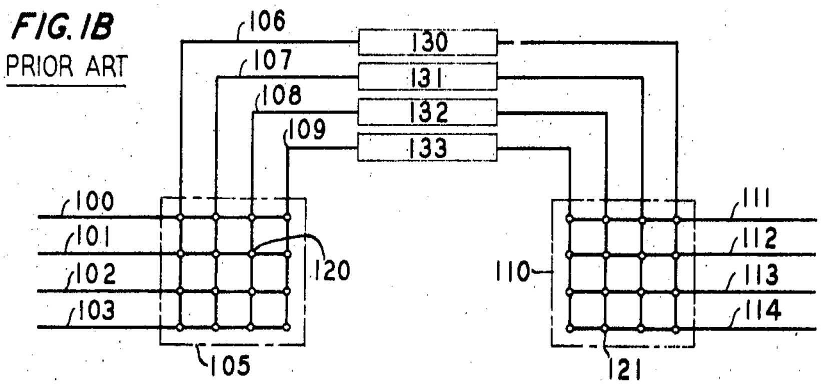
FIG. 1B PRIOR ART
Figure 1C:
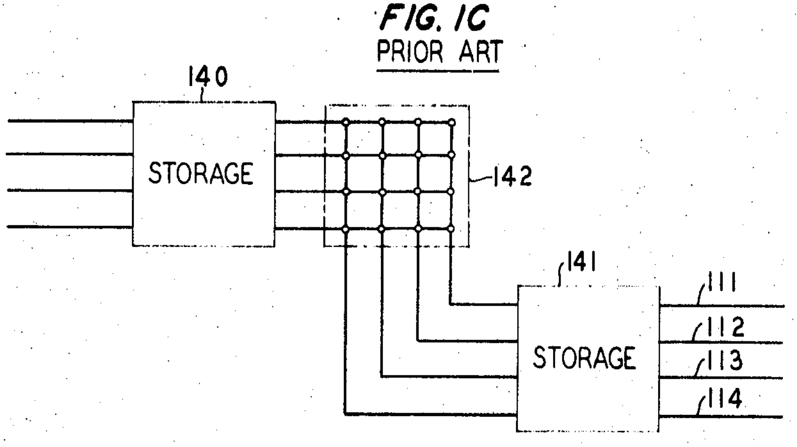
FIG. 1C PRIOR ART

As noted in FIGS. 1A—1C, three prior art arrangements are available for switching time division multiplex information through a network. The FIG. 1A arrangement is disclosed, for example, in D. B. James et al. U.S. Pat. No. 2,957,949 issued Oct. 25, 1960 while the arrangements of FIGS. 1B and 1C are disclosed, for example, in H. Inose et al. application Ser. No. 461,791 filed Jun. 7, 1965, now U.S. Pat. No. 3,446,917, May 27, 1969. Initially time divided information in coded form was switched through time division gates in the manner shown in FIG. 1A. Thus input highways 100—103 each may contain a plurality of distinct messages in time multiplexed channels which are directed to time channels in output highways 111—114 via switching stages 105 and 110 and interstage highways 106—109. In this arrangement a message may be switched from any input highway to any output highway, but it must be retained in the same time channel through the network to preserve system synchronism. For example a message arriving on highway 101 in time channel A may be switched to highway 114 so long as it remains in channel A. This may be accomplished, for example, by enabling time division gates 120 and 121 simultaneously during time channel A, the message then being transferred via junctor 108.

The major disadvantage inherent in this approach is evident from consideration of the possibility, in the previous example, of time channel A being occupied with other messages in succeeding stages of the network reached through outgoing highways 111—114. Such a condition, of course, prevents completion of the connection involving a message in time channel A of highway 101, and it is said that the call is blocked. Such blockage may occur despite the fact that some channels in the outgoing trunks are available for assignment, thus presenting a difficult traffic-handling problem.

Prior art solutions to this blocking problem are illustrated in FIGS. 1B and 1C. A delay device, included in each transmission path through a switching stage, permits an interchange of time channels thereby facilitating the completion of a call connection through this stage so long as any time channel is available in each highway forming the transmission path. FIG. 1B employs the same basic approach as that shown in FIG. 1A except that storage has been introduced into the intermediate highways. Thus an input time channel is switched onto an intermediate highway in its original time channel as before, but the delay encountered in the corresponding one of devices 130—133 permits it to leave the intermediate highway in a different time channel. Thus in the example used to illustrate the FIG. 1A operation, if channel A is occupied on highway 114, a message arriving on highway 101 in channel A still may be switched via highway 108, through crosspoints 120 and 121, simply by delaying the message in device 132, FIG. 1B, so as to appear in previously idle channel B on highway 114. FIG. 1C depicts another prior art approach in which time channel interchange is employed. In this instance the signal transmission rate within the network is different from that on the highways. Thus message signals are delayed in storage apparatus 140 and 141 until time channels are available through the switch matrix 142 and on the output highways 111—114 respectively.

THE BASIC SWITCH

Turning now to FIG. 2, a switching network and its control, in accordance with one illustrative embodiment of my invention, is depicted. Although the time channel interchange principle is employed therein, this arrangement is distinct from the prior art arrangements depicted in FIGS. 1B and 1C in that the delay and switching operations are performed by the same element. FIG. 2 contains a 2×2 matrix of such elements, 210—213, designated hereinafter as crosspoint stores, which stores are controlled by local memory 215. Input highway 201 has access to output highways 203 and 204 via crosspoint stores 210 and 211 respectively. Similarly, input highway 202 has access to output highways 203 and 204 via crosspoint stores 212 and 213.

The crosspoint stores 210—213 are identical in structure, each containing in this illustrative embodiment, a pair of shift registers, a pair of counters, and associated logic circuitry, as depicted in store 211. However, it should be apparent that other storage or delay arrangements may serve this purpose equally well. The shift registers 230 and 231 provide a first-in last-out storage operation for signals received from the input highway 201. Counters 235 and 236 record the number of message signals entered in the respective registers in each frame and control the output of the same number of message signals in the next frame on highway 204. The message signals on input highway 201 are applied to store 211 via lead 220 upon receipt of an appropriate command from local memory 215 on control lead 221. These message signals are shifted sequentially into and retained by one of the two shift registers 230 and 231 in store 211 during a complete cycle of time channels, or frame. At the end of the frame, a signal from the common control on lead 222 enables store 211 to apply its content registered during the previous frame sequentially to output highway 204 via lead 223. When empty, store 211 is arranged to enable store 213 via lead 224 to begin applying the content of store 213 to highway 204.

The use of two shift registers 230 and 231 in store 211 permits the storage and discharge operations to occur simultaneously during each frame. Thus while one register is receiving message signals from input highway 201, the other register is applying the message signals stored during the previous frame to output highway 204.

Local memory 215 comprises a pair of recirculating shift registers 240 and 241, each register controlling the storage operation for a pair of crosspoint stores. Thus register 240 enables stores 210 and 211 to receive message signals from input highway 201, and register 241 enables stores 212 and 213 to receive message signals from input highway 202. Registers 240 and 241 contain address information provided by the common control, which information then is applied in sequence in successive time channels to the appropriate crosspoint stores.

The manner of operation is best understood by observing the transmission of message signals through the network. Thus consider, for example, that a message in channel 3 on input highway 201 is being switched to output highway 204. In this instance the common control places the address of store 211 in register 240 so that it will appear on lead 250 at the outset of the second time channel in each succeeding frame. During the current frame it will be assumed that register 230 is receiving data from highway 201 while register 231 is applying data received during the previous frame to highway 204.

The address information, in this instance a binary "0," is passed to store 210 on lead 225 and to store 211 via inverter 245 and lead 221. The binary "0" is changed to a binary "1" by inverter 245, in which form it serves to enable AND gate 232 via lead 221. Counter 235 adds to its count and register 230 is enabled via AND gate 233. Thus upon the appearance of time channel 3 in the current frame, register 230 will accept the message signal available on input highway 201 via lead 220 and AND gate 233.

At the end of the current frame, flip flop 234 is set to the opposite state by common control via lead 222 thereby reversing the store operations in the next frame. In this example register 231 will be enabled to receive message signals from highway 201 via lead 220 and AND gate 237, while register 230 will begin applying its content in reverse order to highway 204 via AND gate 238, OR gate 239 and output lead 223. Counter 235 controls the retrieval operation having recorded the number of signals to be retrieved during the previous frame. Upon completion of the count, counter 235 will enable store 213 via OR gate 242 and lead 224 to perform a similar retrieval operation during a subsequent portion of the frame. Thus the content of channel 3 is entered in register 230 or 231 in alternate frames and applied to output highway 223 in the next frame.

MESSAGE SWITCHING

Consider now the flow of information in all channels between the input and output highways. As noted in FIG. 3, it is assumed that each highway accommodates eight time channels. For convenience them the message signals in these time channels are designated A—H on input highway 201 and J—Q on input highway 202. It is also assumed that message signals A—E and J—L are switched to output highway 203 and that message signals F—H and M—Q are switched to output highway 204. These operations are implemented simply by determining the channel assignments on the input highways and enabling the appropriate crosspoint stores in the assigned time channels. Thus as noted in FIG. 3, store 210 is enabled during the time channels on input highway 201 assigned to message signals A—E, and store 211 is enabled during the time channels on the same input highway assigned to message signals F—H. Similarly, stores 212 and 213 are enabled during the time channels on input highway 202 assigned respectively to message signals J—L and M—Q.

Figure 3:
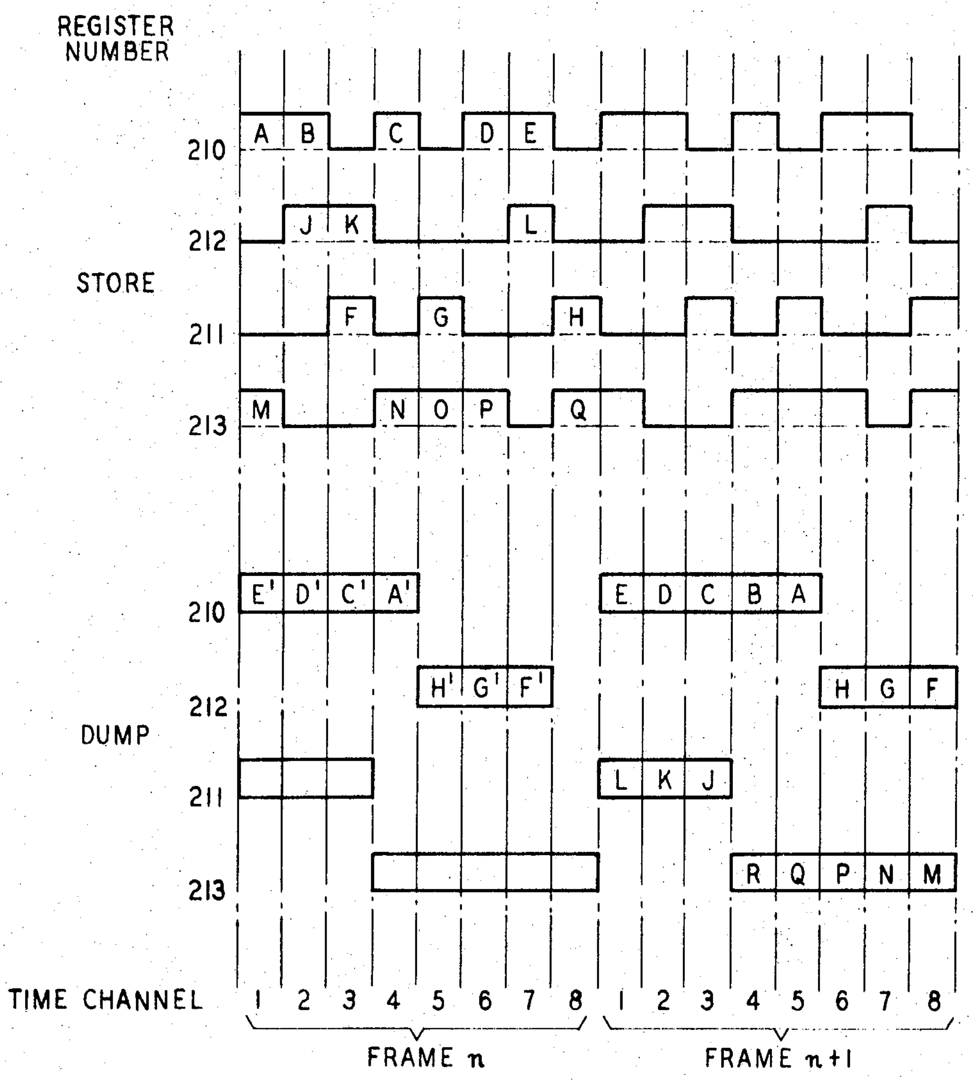
FIG. 3 is a timing chart of the control signals applied to the network of FIG. 2 during a two frame interval.

During each frame, such as *n* and *n*+1 in FIG. 3, the incoming message signals are stored as indicated, and the message signals stored during the previous frame are dumped onto the output highway connected to the outputs of the designated crosspoint stores. As noted in FIG. 3 the message signals are registered in the respective stores in sequence during one frame and are applied to the corresponding output highway in the reverse sequence. For example a sequence of message signals A—E is received on input highway 201 during time channels 1, 2, 4, 6 and 7 of frame *n*. These samples are registered in the same sequence in store 210. These message signals are then retrieved from store 210 in frame *n*+1 in reverse sequence during time channels 1—5 for application to output highway 203. Thus for example message signal B is received in store 210 during time channel 2 of frame *n* is and is applied to output highway 203 in time channel 4 of frame *n*+1. After all of the signal samples stored in register 210 have been retrieved, store 210 automatically enables store 212 to dump its content onto highway 203. The content of store 212 was received from input highway 202 and consisted of signal samples J, K and L. Thus the total content of stores 210 and 212 has a maximum of eight signal samples derived in any combination from the eight time channels on each of input highways 201 and 202. They may appear on both input highways in the same time channel as indicated by signals B and J in time channel 2 of frame *n*, FIG. 3. It is significant that although the signals for a particular message will appear in the same time channel in successive frames on the input highway they may appear in different time channels on the output highway dependent only upon the total number of message signals stored during a given frame. This may be seen by reference to FIG. 3 considering that the message represented by signal B was added in time channel 2 during frame *n*. Thus it is noted that during the dump portion of frame *n* in FIG. 3 the stores 210 and 212 collectively provided seven message signals to output highway 203. The signal-representing message B had not yet been added to the transmission path in the previous frame. Having added message B during frame *n* in time channel 2 which has was previously vacant, it is noted that in frame *n*+1 the signals succeeding message signal C will occupy a different time channel on output highway 203 than they occupied during frame *n;* i.e., these later message signals are pushed back or slipped one time channel in order to accommodate the new message signal. Thus a new message added to one of the transmission paths through the network does not change the order of current messages but rather inserts or squeezes a message signal between two existing message signals and delays the message signals which follow it in time sequence.

LOCAL CONTROL OPERATION

The insertion property of this network is made possible by a local memory 215, FIG. 2, in which circulating shift registers 240 and 241 each store the addresses of a pair of the crosspoint stores 210—213. The operation of these circulating shift registers in order to accommodate the insertion operation of the crosspoint stores may be understood by reference to the loading and unloading operations for the address registers illustrated in FIGS. 4A—4H. Thus in FIG. 4A the normal operation of the memory registers is indicated. Of the eight available stages, corresponding to the eight time channels utilized by the network illustrated in FIG. 2, only seven are currently occupied; viz, stages 1—5, 7 and 8 containing, respectively, addresses C—G, A and B. The unoccupied stage 6 is indicated by crosshatching. As each address reaches the first stage it is applied to the associated pair of crosspoint stores, and depending upon the address, the appropriate one of the stores will be enabled. Simultaneously the address contained in the first stage will be shifted to the eighth stage and to the auxiliary stage and all other addresses will be advanced one stage in the register.

Figure 4A:
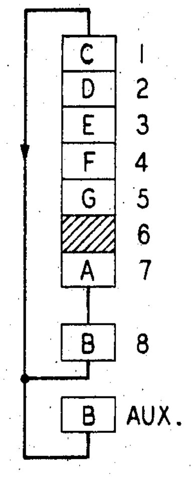
Figure 4B:
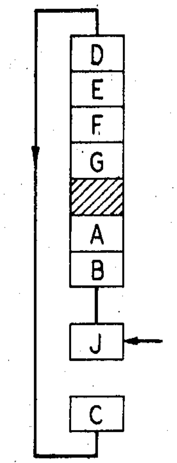

Looking now at FIG. 4B it is noted that the original addresses have been advanced through one stage so that address C now occupies the auxiliary stage. Common control has now determined that a new message will be assigned to time channel 3 which is currently unoccupied on the associated input highway. Since message signals A and B occupy time channels 1 and 2 respectively, in this example, the new message signal J will be inserted between message signals B and C registered in the corresponding crosspoint stores. Therefore when the addresses have reached the positions indicated in FIG. 4B, common control will load the address for message signal J in the eighth stage of the register with stage 1 connected only to the auxiliary stage.

Figure 4C:
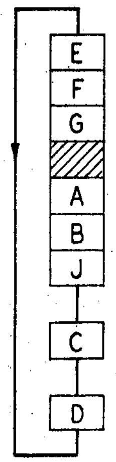
Figure 4D:
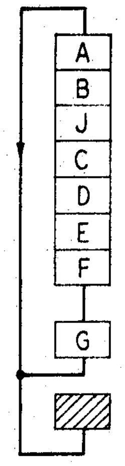
Figure 4E:
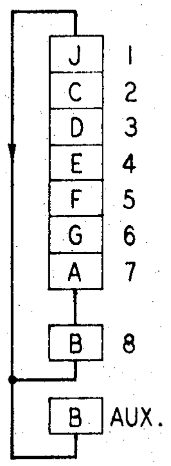
Figure 4F:
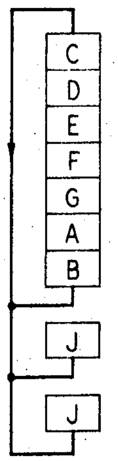

Now, as indicated in FIG. 4C, the auxiliary stage is connected to the register. This of course implies that the eight stages of the local memory register have been increased to nine stages which, of course, would not be compatible with the eight time channel frame if continued for more than one cycle. Thus, as indicated in FIG. 4D, the auxiliary stage is removed from the recirculating path at the end of the current cycle, in this instance, in the presence of an unoccupied time channel. Removal of the auxiliary stage from the recirculating path at this time simply reduces the number of unoccupied stages in the normal eight stage register 240 and, as noted in FIG. 4D, the desired effect is achieved with the address J currently occupying the third stage in a position between addresses B and C.

Figure 4G:
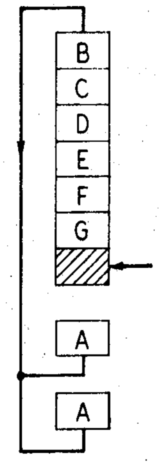
Figure 4H:
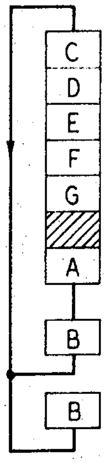

A similar sequence is followed in unloading the register as illustrated in FIGS. 4E–4H. In this example, it is assumed that the register is occupied as in FIG. 4D and that it is desired to remove address J, thus restoring the condition which prevailed in FIG. 4A. The cycle ends after address G in stage 6, FIG. 4E. Thus as noted in FIG. 4F, stage 8 is removed from the register when it contains address J. The cycle continues with a seven stage register until address A, beginning the next cycle, arrives in stage 8. At this time a null condition is inserted in stage 7 as indicated in FIG. 4G. Thereafter normal operation of the eight stage register is restored, FIG. 4H.

The logic circuitry required to perform these operations is well known in the art and is represented by simple three-way switches in FIG. 2 in conjunction with the local memory registers 240 and 241. For example, switch wipers 251 and 255 normally engage contacts 252 and 256 respectively, thus isolating the auxiliary stage 262 and connecting eight stages of the register in the recirculating path. A new address is inserted by moving wiper 255 to contact 257 after the preceding address has been entered in stage 261. Wiper 255 is moved to contact 258 after the new address has been entered in stage 261, temporarily forming a nine stage register. At the end of the current cycle, normal circulation then is resumed by returning wiper 255 to contact 256. To remove an address from the register, wiper 251 is moved to contact 253 after the address to be removed has been entered in stage 261. Prior to the last shift operation in the current cycle, wiper 251 is moved to contact 254, serving to insert a null address in stage 260. At the end of the cycle, wiper 251 is returned to contact 252 so as to resume normal circulation through the eight stage register.

LARGER NETWORKS

The basic switching approach described in connection with FIG. 2 is also applicable to larger switch sizes. As indicated in FIG. 5, for example, a 4×4 switch 501 is illustrated which comprises 16 crosspoint stores. Such a switch, accommodating 64 time channels per input highway, requires a memory 502 in the local control 505 capable of storing 64 addresses, one for each time channel. Each address consists of eight binary digits or bits indicating the destination for each of the message signals arriving on the four input highways during each time channel. Since each incoming message signal may be directed to one of four crosspoint stores a total of eight bits are required in the store addresses, two bits being associated with each input highway. In this instance, therefore, the local memory comprises eight circulating shift registers arranged in pairs such that in each time channel an eight bit address will be directed from the output stage into the decoder 503 where each pair of bits is decoded so as to activate one of four enable leads controlling the four crosspoint stores associated with one input highway.

The basic principle of crosspoint store operation is preserved in the 4×4 switch illustrated in FIG. 5. The important distinction over prior art switching arrangements is evident in the vertical chain operation whereby each crosspoint store in a column is arranged when empty to enable the next store in the chain to apply its content to the associated output highway. Such an operation is implemented simply by enabling each of the crosspoint stores associated with the uppermost input highway at the outset of each frame interval.

This then provides an order preserving mapping of time channels between each of the input and output highways. Transmission of a new message through the network will not alter the order of operation of the crosspoint stores but, instead, simply inserts each new message signal between message signals currently being transmitted, thereby delaying subsequently transmitted message signals by one time channel. Similarly, when transmission of a particular message is completed, the position occupied by signals in that message simply disappears, and all subsequent message signals are moved up one time channel in the transmission order.

Turning now to FIG. 6 a network is illustrated in which each of the blocks represents a 4×4 switch of the type described in connection with FIG. 5. This network comprises 32 input highways each accommodating 64 time channels. This network bears similarities to conventional networks of the crossbar type as known in the art. Thus the upper four columns of 4×4 switches would correspond to a first crossbar switch frame and similarly the lower four columns of 4×4 switches would correspond to a second crossbar switch frame. These two switch frames are then cross connected to form a typical switching network which is readily implemented by the 4×4 crosspoint stores in accordance with my invention.

SYSTEM OPERATION

A network capable of satisfying complete system requirements is illustrated in FIG. 7. The central switching network 73 is of the type illustrated in FIG. 6. On the input side of this network is a concentrator stage 72 capable of receiving information multiplexed on a plurality of input highways. For example, messages received from terminal stations, such as telephones 70–1 through **70–*n*, via line circuits 71–1 through 71–*n* are combined in multiplexer 700 for application to input highway 710. Concentrator 72 receives message and supervisory signals provided on the input highways in a predetermined number of time channels, some of which accommodate supervisory signals which are subsequently directed, via control highway 720, to common control 78. Message signals contained in the remaining time channels on each input highway are directed to central switch 73 via intermediate highway 721**.

Common control 78 accepts the supervisory information and utilizes it to establish and take down network connections required to facilitate message transmission. This control includes directing the establishment of connections through expandor 75, which is the counterpart of concentrator 72, serving to direct the message signals received from central switching network 73 to the proper output highways such as highway 751.

The operation in the expansion stage includes the mixing of message signals from the network with supervisory signals from common control 78 and adding tone signals such as busy, dial, etc. Each output highway terminates on a multiplexer which, in turn, directs the message signals to the proper destination terminals. Thus message signals on highway 751 are directed through demultiplexer 76 to the appropriate demodulators in line circuits 77–1 through **77–*n* corresponding to the desired destination stations 78–1 through 78–*n***. This, of course, is a four-wire network of which only one direction of transmission is illustrated.

THE LINE UNIT

Turning now to the detailed network depicted in FIGS. 10-—12, the function of the line unit, FIG. 10, is to convert signals from the telephone 70–1 to a form that can be utilized by the switching network and to allow the system to transmit analogue or digital message and control signals to the telephone. In particular line unit 71–1 is arranged to detect the off-hook condition of telephone 70–70–1 and to transmit various tone signals and speech to and from the telephone. The two wire telephone line 1000 is inverted by hybrid transformer 1001 to a four-wire system having unidirectional send and receive paths 1020 and 1021 respectively. The hybrid secondary windings are connected respectively to delta modulator 1002 and delta demodulator 1003, this type of operation being disclosed for example in H. Inose et al. U.S. Pat. No. 3,223,784 issued Dec. 14, 1965. Changes in the current through line loop 1000, indicating various activity states of telephones 70–1, are detected on the primary side of hybrid 1001 and multiplexed with message signals before reaching concentrator 72, as disclosed, for example, in the aforementioned D. B. James et al. patent.

Delta modulation, as known in the art, is utilized to transmit the message signals trough the network. Thus consecutive samples of analogue signal from telephone 70–1 are encoded in delta modulator 1002. In brief, the analogue signal from hybrid 1001 is applied to comparator or difference circuit 1005 where it is compared with the output of integrator 1006. The output of comparator 1005, in turn, is applied to sampler or pulse modulator 1007 which provides a binary "1" pulse if the difference signal is positive and a binary "0" pulse if the difference signal is negative each time a clock pulse is received on lead 1008. The "quantized" output of sampler 1007 then is transmitted to integrator 1006 and the operation is repeated in the next time interval.

The output of sampler 1007 also is transmitted as a sequence of binary "1" and "0" signals to the send path 1020.

Advantageously, the transmission rate of these delta modulated signals may be reduced for ease of handling by the switching network through the utilization of some form of pulse code modulation at this point. Line circuit 71–1 also converts the delta modulated signals arriving on receive path 1021 back to analogue form in delta demodulator 1003.

CONCENTRATION

The function of concentrator 72, FIG. 11, is to receive traffic from lightly loaded input highways and to apply it to a smaller number of heavily loaded intermediate highways. The delta coded signals on send path 1020 first are applied to multiplexer 1100. In this example information from fifty telephones, including telephone 70–1, is received in multiplexer 1100 to facilitate groupings on central office switch frames. The output of multiplexer 1100 then is a bit stream in a 64 time channel frame including 50 time channels of message signals and 14 time channels reserved for supervisory information such as requests for service and disconnects. This mixture of information is applied to concentrator 72 via input highway 710. The number of input highways entering a concentrator depends upon the level of blocking which can be tolerated by the system. Calculations indicate that a practical level may be achieved with between four and nine input highways depending upon individual telephone line occupancy levels. Five input highways are illustrated in FIG. 11.

Concentrator 72 is similar in structure to the basic 4×4 switch, FIG. 5, except that the number of input and output highways depends upon the concentration ratio. One of the output highways; i.e., control highway 720, is used to periodically sample the supervisory information received on the input highways and to transmit such information through the appropriate crosspoint stores 1120—1124 to common control 78 for examination. The other outputs, in this is instance only intermediate highway 721, carry the concentrated message signals from crosspoint stores 1125—1129 to the switch 730 in the first stage of central switching network 73. Thus a 5 to 1 concentration is provided in the illustrated example.

Each input highway is associated with a 64 bit shift register, such as register 1110, the contents of which are continuously circulating. A "1" signal on highway 710 in a time channel assigned to supervision indicates that the telephone associated with the corresponding supervisory time channel is off-hook and that common control 78 must write a "1" in the corresponding shift register. A separate wired memory retains the information concerning supervisory bits which must be sampled and transmitted to common control 78.

EXPANSION

Upon leaving concentrator 72 the message signals are routed via intermediate highway 721 to switch 730 in four frame central switching network 73 through which they fan out and finally arrive at expandor circuits, such as expandor 75, where the necessary routing to the appropriate demodulators and associated telephone terminals is effected.

Expandor 75 receives a sequence of message signals from switch 740 via intermediate highway 741 as well as from each of the other switches in the output stage of the central switching network 73 via corresponding intermediate highways. As indicated heretofore the destination of each of these message signals is predetermined but their time channel assignments will vary according to the state of the network in each successive time channel. The problem then is to assure that the proper group of demodulators receives the signals destined for the associated telephones while at the same time assuring that a particular message signal reaches the proper demodulator in the same time channel of the current as each of the other signals in the same message as received in preceding and succeeding frames.

In accordance with this embodiment of my invention this problem is solved in the manner illustrated in FIG. 12. Expandor 75 comprises a 2×5 crosspoint store switch which provides the desired expansion from intermediate highway 741 to the five output highways including highway 751. The inputs to expandor 75 are message signals from central switching network 73 on intermediate highway 741 and supervisory signals from common control 78. By means of the 10 crosspoint stores in expandor 75, these signals are rearranged and placed on the five output highways. This accomplished under control of a 64 word local memory 1210. The output highways are connected to demodulators 77–1 through 77–*n* via corresponding crosspoint stores in demultiplexer 76. In this instance each output highway serves 50 demodulators. Signals on the output highways are routed to the correct demultiplexer crosspoint store and corresponding demodulator by 64 word memories 1220—1224, each associated with one of the output highways. In order to avoid the introduction of FM noise into the signals the demodulators receive the stored message signals from the corresponding demultiplexer crosspoint stores during a fixed time channel. Thus the crosspoint stores in demultiplexer 76 each comprise a two-stage register which provides a single time channel delay.

PATH LOCATION

It would be profitable at this point to examine the manner in which a path through the network is located and established in accordance with the illustrative embodiment of my invention. Locating a path through the network requires at the outset a determination of which of the switches in network 73 will be included in the connection. As mentioned previously, this is a four-wire system which in effect comprises two separate switching networks, one for each direction of transmission. For purposes of this illustration it will be considered that the two networks are operated symmetrically so that them the manner of determining a network path is the same for both of these networks. In addition a determination of a network path requires the storage of routing information in the local memories controlling the crosspoint stores and some means for locating this stored information when required.

Given the originating and terminating points in a message connection, the possible paths for transmission of the message between the terminals is uniquely determined by the character of the network itself. Thus a path determination includes an examination of the possibilities for blocking the network paths. These include intermediate highway mismatch and intermediate highway saturation, the former occurring when a selected sequence of intermediate highways cannot be interconnected because one of the crosspoint stores in the selected path is fully loaded, and the latter occurring when all 64 time channels are utilized in some portion of the selected path. Thus in order to select a path, common control 78 must determine whether there are any free time channels in the intermediate highways and whether the crosspoint stores having access to the selected intermediate highways have space available for storage of message signals.

Control information as to the availability of intermediate highways is stored in memory as a single bit for each crosspoint store. The same binary condition of this bit indicates whether or not both conditions of available intermediate highways and crosspoint stores are satisfied. The four switch-frame system comprising 1024 crosspoint stores disclosed in FIG. 7 thus requires only 1024 bits to store the requisite path data. Common control 78 is programmed to provide the proper bits in memory to the appropriate control points in the network path given only the message terminals.

Having identified the crosspoint stores through which a particular message will be transmitted, common control 78 must determine in which time channels the message signals will arrive in each network stage. This determination is easily achieved by employment of the routing information; viz, the crosspoint stores through which the message will pass, and the current state of the network. This approach requires a knowledge of as to the number of messages being transmitted through the crosspoint stores in the selected path as well as the time channels in which these messages are received in the selected crosspoint store.

An example of the manner in which this information is derived is indicated in FIG. 8 which depicts a portion of the network of FIG. 7, including concentrator 72 and the interconnected switch 730. As noted in FIG. 8, the number of calls going through each of the crosspoint stores 1127 and 801 during a selected frame interval is indicated by numbers appearing to the right of blocks representing the stores. In this instance we will observe the result of the insertion of a new message in input highway 711 occupying time channel 12, which message must be connected to link highway 731 at the output of switch 730. Signals from this message are first inserted in crosspoint store 1127 of concentrator 72. It is noted in the exploded view in FIG. 8 that crosspoint store 1127 previously contained five message signals in time channels 1, 4, 7, 15 and 19. Since the current message occupies time channel 12, each signal in this message will be inserted between signals occupying time channels 7 and 15. Thus upon completion of the first frame in which the new message is transmitted, crosspoint store 1127 will contain a sequence of six message signals as received in time channels 1, 4, 7, 12, 15 and 19. In effect, effect then, the signal received in time channel 12 has been inserted in crosspoint store 1127 where it occupies a position between the signals received in time slots 7 and 15. During the next frame interval, crosspoint stores 1125—1129 will have their content dumped in sequence onto intermediate highway 721 beginning with store 1125. As described in connection with FIG. 2, the stores are dumped on a first-in last-out basis such that the message signal occupying time channel 12 on input highway 711 will be retrieved from crosspoint store 1127 and inserted in highway 721 following the four message signals from store 1125, the three message signals from store 1126 and the two message signals which were inserted in store 1127 subsequent to the signal in channel 12. Thus the message signal in question will occupy the time channel on highway 721 following the time channels which contain the preceding 4+3+2 message signals, or time channel 10.

In order to for this message signal, now in time channel 10 on highway 721, to reach the designated highway 731, it must be stored in switch 730 in the vertical column of crosspoint stores including store 801. As noted in FIG. 7, highway 721 enters switch 730 on the first level such that crosspoint store 801 must be utilized.

In order to determine the time channel in which this message signal will emerge from switch 730, it is only necessary to determine, during a given frame, the number of message signals which enter store 801 subsequent to this message signal. As noted in the diagram to the right of switch 730, store 801, previous to receipt of this message in time channel 10, contained signals received during the five time channels 5, 7, 15, 20 and 25. Thus in the current frame, the message signal in channel 10 is inserted in store 801 between the message signals received in time channels 7 and 15 so that the order of channel occupancy becomes 5, 7, 10, 15, 20 and 25, since signals in channels 15, 20 and 25 were inserted in store 801 subsequent to the signal in channel 10. The latter signal will be retrieved from store 801 and placed on link highway 731 in time channel 4. Thus the particular message in question altered its position from time channel 12 to time channel 10 in passing through concentrator 72 and from time channel 10 to time channel 4 in passing through switch 730.

The foregoing method for determining the output time channel at each stage of the network requires a knowledge of all message currently being transmitted through each crosspoint store. This information may be derived from data stored in common control 78, which data provides the details concerning the routing of each message currently being transmitted. However, in accordance with this embodiment of my invention, this information is easily derived from the local memories. For example, as the local memory examines concentrator 72, FIG. 8, during information retrieval in a particular frame interval, the number of message signals entered in stores 1125 and 1126 are counted. Similarly, the message signals entered in store 1127 after time channel 12 are counted.

The output channel on highway 731 is determined simply by observing the number of message signals entered in store 801 after time channel 10. The circuitry required to perform this counting operation is illustrated in FIG. 9 which contains the local memory for switch 730 in greater detail. The local memory for concentrator 72 and expandor 75 would operate in a similar manner. Each basic switch, such as switch 730, requires four recirculating shift registers of the type illustrated in FIG. 2, each capable of registering 64 two-bit words. One of these registers 901, FIG. 9, controls four crosspoint stores including store 801. During normal operation, register 901 recirculates the stored information continuously, with the word stored in the first register stage being applied to decoder 902 for subsequent routing to the proper crosspoint store in switch 730.

When it is desired to enter a new crosspoint store address in shift register 901, the address is first entered in register 903, and the address of the time channel for which it is destined is entered in channel register 904. When this channel address matches the current time channel as indicated by clock 905 in comparison circuit 906, feedback control 907 will insert the desired address from register 903 in register 901 in the manner described for FIGS. 4A—4C. When the last time channel containing an address reaches the first stage of register 901, feedback control 907 will be alerted to discontinue the insertion process and to restore the normal recirculation through register 901. Normally, when the last address stored in register 901 reaches the output stage, the signal produced by a comparison of this register stage with the current time channel will inhibit decoder 902 thereby preventing the crosspoint stores in switch 730 from accepting any more message signals during that frame.

In order to determine in which time channel a message signal will emerge from switch 730, common control 78 must transmit to the corresponding local memory, FIG. 9, the designations of intermediate highway 721, the input time channel and intermediate highway 731. These designations are stored in the respective registers 910, 904 and 903. At the outset of the next frame after receipt of these designations, the address retrieved from each shift register, such as 901, is compared with the designation of highway 731 in a comparison circuit such as 908.

Accumulator 911 is incremented upon detection of each match indicating an active time channel in a level of switch 730 preceding the one in which the new message will arrive. For example, in FIG. 8 this would require a count of the number of times that the local memory shift registers designating the first level of switch 730; i.e., highway 721, contained the number designating the fourth column of switch 730; i.e., highway 731, indicating that an address would be sent to store 801. Thus accumulator 911 is incremented each time the local memory shift registers contain the designation of the fourth column of switch 730 between the first time channel and the input time channel. This, in fact, would count the number of message signals traversing store 801 before the new message arrives therein.

The matching information is transmitted to gating circuit 915 which checks the switch level from which it was derived as well as the relationship between the current time channel and the input time channel. The number to be added to accumulator 911 is determined in this fashion. At the end of the frame, accumulator 911 contains the output time channel designation which can then be used to repeat the process for the switches through which this message subsequently will pass.

Each local memory retains the input and output time channel designations. When the time channels for a message have been determined for all stages of the network the common control enables all of the switches in the message route so as to make the necessary changes during the same frame. When a message transmission has been completed the connection is taken down in a similar manner. Based upon information in common control 78 about the path the message follows, the time channel assigned may be traced in a similar manner. When the tracing is completed common control 78 enables all stages to remove the connection simultaneously.

The advantage os of using circulating memories for storage of detailed routing information resides in the fact that the common control need only decide which of the switches in the network the message will traverse in order to determine complete routing information. The details of time channel assignments are handled automatically by the switching network itself. Thus the common control need only store a relatively small amount of information concerning existing network connection for which it may derive the details at any time and the network itself may complete connections when it is provided with the basic path desired. Thus the information-processing power incorporated into the switching network simplifies common control storage requirements.

An important advantage of this arrangement arises from the fact that each crosspoint store applies message signals to intermediate highways in blocks at the beginning of each frame thereby assuring that all of the unused storage space will appear at the end of a frame. If several message signals arrive in adjacent time channels on the input to a switching network of this type and follow the same route through the network they will arrive at the end of the network together and in the same order if the network crosspoint stores operate on a first-in first-out basis. However, if the stores operate on a last-in first-out basis, as in FIG. 2, the order will be reversed if there is an odd number of stages in the network but will be correct if there is an even number of stages in the network. Advantageously then, as different length messages are presented to the concentrator, they may be packed together on an input highway so as to utilize all available time channels. They then would arrive on the network output highway as blocks of message signals in the same order as they were received on the input highway.

The switching network in accordance with this embodiment of my invention also may interconnect lines operating at different bit rates provided that the bit rates are all multiples of a lower bit rate. For example, the network may switch messages simultaneously received on input highways at 10, 30 and 40 kilobit rates by treating the highways transmitting information at the 30 and 40 kilobit rates as requiring respectively three and four adjacent time channels on the link highways. Of course if exact synchronization is not present between these different transmission rates some buffering will be required.

It is to be understood that the above described arrangement is illustrative of the application of the principles of the invention. Numerous other arrangements may be devised by those skilled in the art without departing from the spirit and scope of this invention.

I claim:

1. In a time division switching system a matrix having time-multiplexed input and output highways, a crosspoint device connecting each of said input highways to each of said output highways, means for defining a plurality of time slots in a repetitive cycle, means for storing data received from said input highways in said crosspoint devices during corresponding time channels of a first cycle, and means operative in the next cycle for transferring the stored data from a plurality of said crosspoint devices in sequence to said interconnected output highway.

2. A switching network for transferring signals multiplexed in time channels on input highways to time channels on preselected output highways comprising switching means connected between each of said input and output highways, said switching means comprising means at each switching crosspoint for storing a plurality of said signals.

3. A switching network in accordance with claim 2 wherein said means at each switching crosspoint comprises a multistage shift register.

4. A switching network in accordance with claim 2 wherein said means at each switching crosspoint comprises a variable delay device.

5. A switching network in accordance with claim 2 wherein said means at each of said switching crosspoints comprises means operative upon transfer of the stored signals to the corresponding output highway for enabling said means at another one of said switching crosspoints to initiate a transfer of the stored signals to said corresponding output highway.

6. A switching network in accordance with claim 2 and further comprising memory means for storing a sequence of location commands in storage areas corresponding to said plurality of time slots, and means interconnecting said memory means and said switching means for selectively enabling said switching means in the time slot containing the corresponding location command.

7. A switching network in accordance with claim 6 wherein said memory means comprises a reentrant shift register having means for adding a stage to the reentrant loop in order to add and subtract location commands.

8. In a time division switching system, a multistage switching network having input paths, output paths, and switching crosspoints for interconnecting said input and output paths, said crosspoints including means for storing a plurality of signals received from said input paths, means for defining a plurality of time channels in a repetitive sequence, means for assigning a request for service to a distinct time channel on one of said input paths, and means for assigning a time channel in each switching stage to the resultant call connection as determined by the number of previously occupied time channels utilizing the same output path.

9. In a time division multiplex communication system, a switch matrix comprising a plurality of input highways, a plurality of output highways, a crosspoint device connected between each of said input and output highways, said crosspoint devices including means for storing data received from said input highways, means for defining a plurality of time channels in a repetitive cycle, means for detecting a request for service in a first time channel on a selected one of said input highways, means for determining a second time channel on a selected one of said output highways comprising means for counting the number of previously occupied time channels in said selected output highway preceding said first time channel in the repetitive cycle, and means for enabling one of said crosspoint devices to connect said first time channel on said selected input highway to said second time channel on said selected output highway.

10. A switching system for interconnecting a plurality of lines in a communication system for the transfer of information signals between said lines comprising a crosspoint matrix for selectively interconnecting said lines in pairs, each crosspoint in said matrix comprising storage means for storing a plurality of said information signals.

11. A switching system in accordance with claim 10 and further comprising means interconnecting said crosspoints for enabling said storage means in sequence.

12. A switching network comprising a matrix of crosspoint stores arranged in rows and columns, a plurality of highways each transmitting message signals multiplexed in distinct time channels of a repetitive frame, means for selectively connecting each of said crosspoint stores in a matrix row to a corresponding one of said highways during distinct time intervals to receive the content of the corresponding time channels in said one highway and means operative during receipt of the next frame of time channels in said matrix for applying the content of each of said crosspoint stores in a matrix column to a corresponding one of said output highways.

13. A crosspoint for a switching matrix in a time division switching system, said crosspoint comprising input means, output means, a pair of storage means, means connecting said input and said output means to both of said storage means, and control means for alternately allowing, first, the simultaneous reception of information from said input means by one of said storage means and transmission of information to said output means by the other of said storage means, and, then, the simultaneous reception of information from said input means by said other storage means and transmission of information to said output means by said one storage means.

14. A crosspoint for a switching matrix in a time division switching system in accordance with claim 13 wherein said storage means are multibit storage devices and said input and output means are connected to said devices so that said devices operate on a first-in last-out basis.

15. A time division switching system having crosspoints in accordance with claim 13 and further including memory means for said crosspoints, said memory means including a reentrant shift register and means for inserting and removing information from said reentrant shift register.

16. A time division switching system in accordance with claim 15 wherein said information inserting and removing means includes an auxiliary stage for said reentrant shift register.

17. A time division crosspoint switching matrix comprising a plurality of crosspoints in plural arrays, each of said crosspoints including storage means, means for inserting information into and for removing information from said storage means, and means for enabling the subsequent crosspoint in the same array after said information is removed from said storage means.

18. A time division switching system having a plurality of input lines, a plurality of output lines, and a crosspoint switching matrix in accordance with claim 17, wherein each of said crosspoints in an array is connected to a different input line but the same one of said output lines.